Nov. 30, 1954

M. HELLAND 2,695,570

DOUGHNUT-MAKING MACHINE

Filed Feb. 28, 1952

INVENTOR.
MARTIN HELLAND
BY
Lyon & Lyon
ATTORNEYS

Nov. 30, 1954  M. HELLAND  2,695,570
DOUGHNUT-MAKING MACHINE
Filed Feb. 28, 1952  8 Sheets-Sheet 4

INVENTOR.
MARTIN HELLAND
BY
Lyon+Lyon
ATTORNEYS

Nov. 30, 1954     M. HELLAND     2,695,570
DOUGHNUT-MAKING MACHINE
Filed Feb. 28, 1952     8 Sheets-Sheet 5

INVENTOR.
MARTIN HELLAND
BY
ATTORNEYS

Nov. 30, 1954  M. HELLAND  2,695,570
DOUGHNUT-MAKING MACHINE
Filed Feb. 28, 1952  8 Sheets-Sheet 7

INVENTOR.
MARTIN HELLAND
BY
Lyon & Lyon
ATTORNEYS

United States Patent Office 2,695,570
Patented Nov. 30, 1954

2,695,570

DOUGHNUT-MAKING MACHINE

Martin Helland, Los Angeles, Calif.

Application February 28, 1952, Serial No. 273,851

7 Claims. (Cl. 107—8)

My invention relates to a doughnut-making machine and more specifically, to a machine that automatically forms and punches a ball of dough to convert the same into the shape of a doughnut, and then places said formed doughnut on a delivery device on which it may be dispatched to the proofing cabinet raising process previous to cooking.

An object of my machine is the preparation of a raw doughnut from a ball of dough, and especially a raw "raised" doughnut.

In general my invention comprises a device in which the dough in the form of a sphere is placed in a machine and is then flattened, the center pushed out and the doughnut picked up by a suction pad and placed on a conveyer belt while the extracted core is returned to the dough-making machine.

Other objects and advantages of my invention will be apparent from the following description of the preferred embodiments thereof.

In the drawings.

Fifiure 20 is a section taken on the line 20—20 of Figure 18.

A doughnut making machine constructed in accordance with my invention has a central column 1 supported by any pedestal or base upon which is placed a rotating sleeve 2. Permanently affixed to the sleeve 2 is a chain gear 3, which is connected by a chain (not shown) to a suitable source of power, such as an electric motor (not shown). The column 1 carries a collar 4 which has attached thereto a ring 5. The upper surface of the collar 4 has a ball bearing race 6 therein in which the bearings 7 are positioned. A bearing member 8 attached to the sleeve 2 rides on the bearings and carries the weight of the sleeve 2, allowing it to rotate freely on the column 1. A ring 9 is carried upon the bearing member 8 and the surfaces between the rings 9 and 5 are ground to make as perfect a fit as is necessary to maintain a sealing joint between them.

The sleeve 2 has a pair of collars 10 and 11 upon which paired arms 12, 13, 14 and 15 are pivotally mounted. There are eight of each of these paired arms 12, 13, 14 and 15 equally spaced around the collars 10 and 11. Housing members 16 and 17 are permanently affixed to the column 1 and do not rotate thereon. At the end of each paired arm 12, 13, 14 and 15 is journaled a roller 18 adapted to run in the guide channels 19, 20, 21 and 22, making a run for the rollers 18 which will cause the paired arms 12, 13, 14 and 15 to move up and down as the rollers 18 run around the various guides.

At the ends of each pair of arms is carried a clevis 25. The paired arms 13 are connected to a tube 26 by means of a bushing 27 which has projections 28 and 29 on each end thereof to hold said bushing in a movable position in the clevis 25. The tube 26 carries on its end a ring 30. A push rod 31 is slidably mounted in the tube 26 and is connected to the paired arms 12 by means of a bushing 32 having the projections 33 and 34 thereon to hold them in a movable position in the clevis 25 carried by the arms 12.

The push rod 31 has a pressure plate 35 mounted on its end, said pressure plate being of the same size as the interior of the ring 30 and adapted to slide up and down therein. A hole 31a provides a means of porting air through said pressure plate 35.

The paired arms 14 have a tube 36 attached by means of the same type of bushing 27 and clevis 36a. A cup 37 is attached to the other end of the tube 36. The paired arms 15 are connected to a hollow push rod 38 slidable in the tube 36 with the same type of bushing 27 and clevis 38a. An ejector plate 40 is attached at the upper end of said rod 38, said ejector plate 40 being substantially the same size as the interior of the cup 37 and adapted to slide therein. The ejector plate has a port 40a therethrough.

Attached to the sleeve 2 are guide members 41, 42 and 43, having holes 44, 45 and 46 therein through which the tubes 26 and 36 extend. A bed plate 47 is attached to the sleeve 2 and rotates therewith. This bed plate 47 has eight holes 48 in axial alignment with the guide holes 44, 45 and 46.

The ring 9 has bores 50, 51, 52 and 53 which correspond to similar bores 54 in the gear 3. In these bores are positioned springs 55 to hold the ground face of the ring 9 in airtight connection with the ground face of the ring 5. Air under pressure is supplied by means of the pipe 56 from any source of supply and it is ported through the ring 5 by means of the port 57 into and out through the ports 58 equally spaced around the ring 9. A pipe 59 connects each of the eight tubes 36 to one of the ports 58 to supply a source of air under pressure to the interior of said tubes when a port 58 is aligned with the port 57. A similar pipe 61 is connected to a suction device and to a slot 62 in the ring 5 so that when the ports 58 pass over the slot 62 suction is applied through the pipe 60 to the tubes 36.

Figure 1:
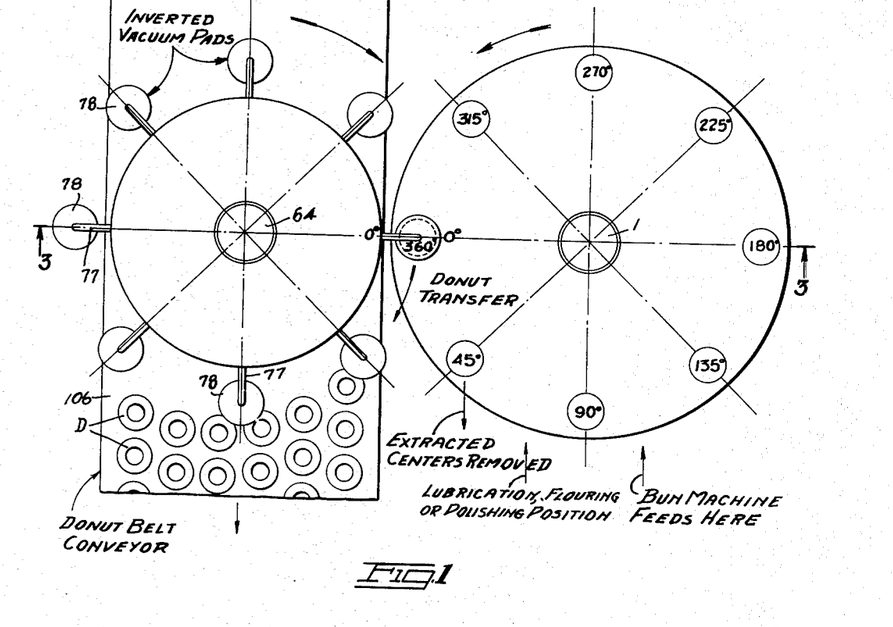
Figure 1 is a schematic diagram in plan of the doughnut-forming machine.

The operation of the last described portion of my doughnut manufacturing machine is as follows: A standard bun-manufacturing machine is used in connection therewith and this machine feeds a round roll of dough D to the bed plate 47 at a position between the points marked 90° and 135° on Figure 1. At this point in the operation of my machine the guide channels 19 and 20 are at their most elevated position so as to hold the ring 30 and pressure plate 35 in their elevated positions and the guide channel 21 holds the cup 37 in its lowermost position and the guide channel 22 holds the ejector plate 40 in its highest position. At this time the rings 9 and 5 are in such a position that no pressure or vacuum is applied to the particular pipes 59 and 60.

Figure 2:
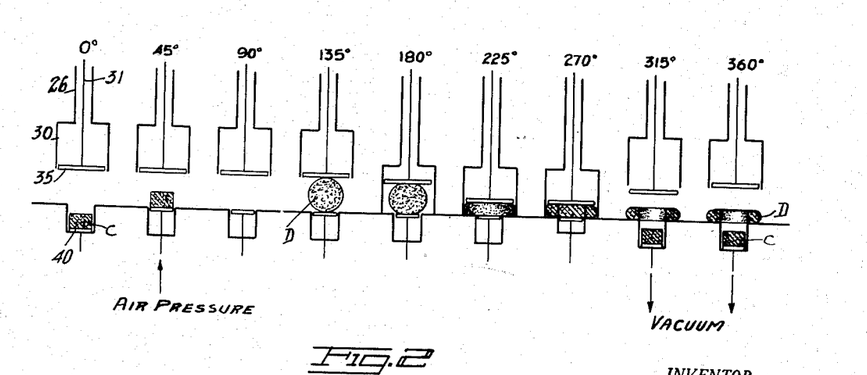
Figure 2 is a diagrammatic view of the formation of the doughnut.
Figure 3:
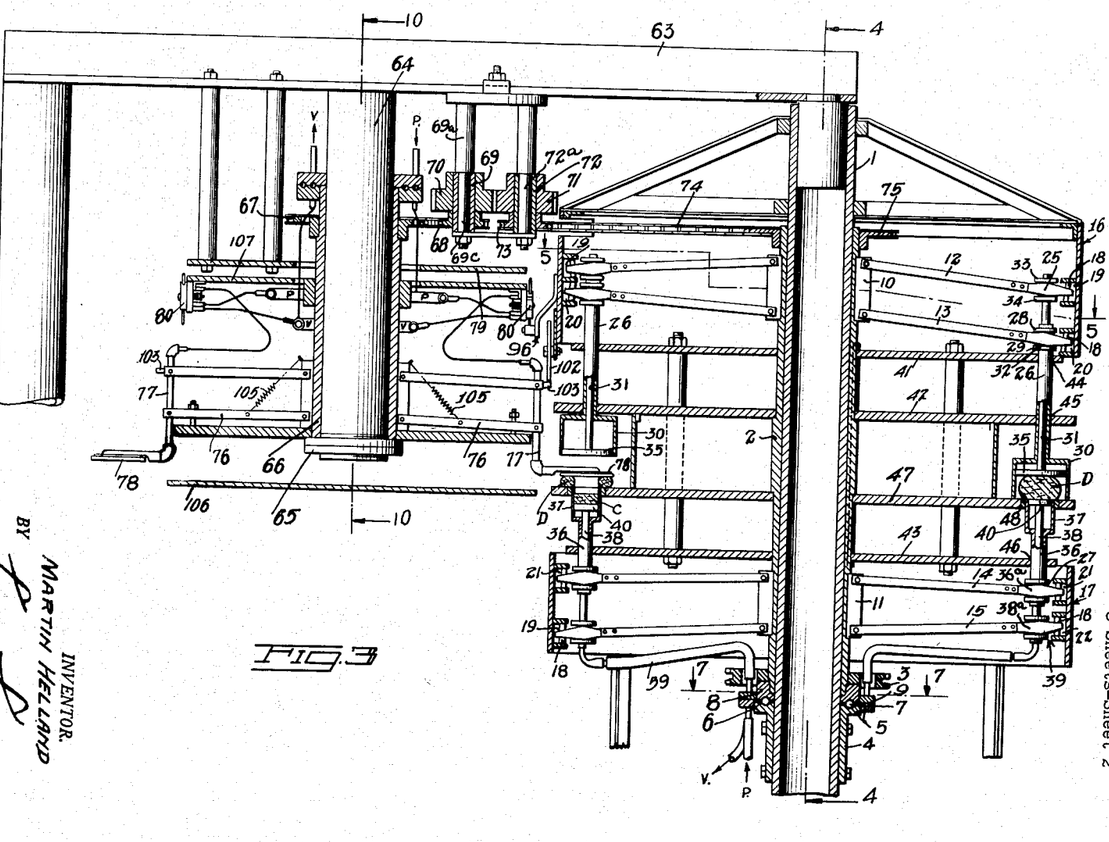
Figure 3 is a vertical section on the line 3—3 of Figure 1.
Figure 4:
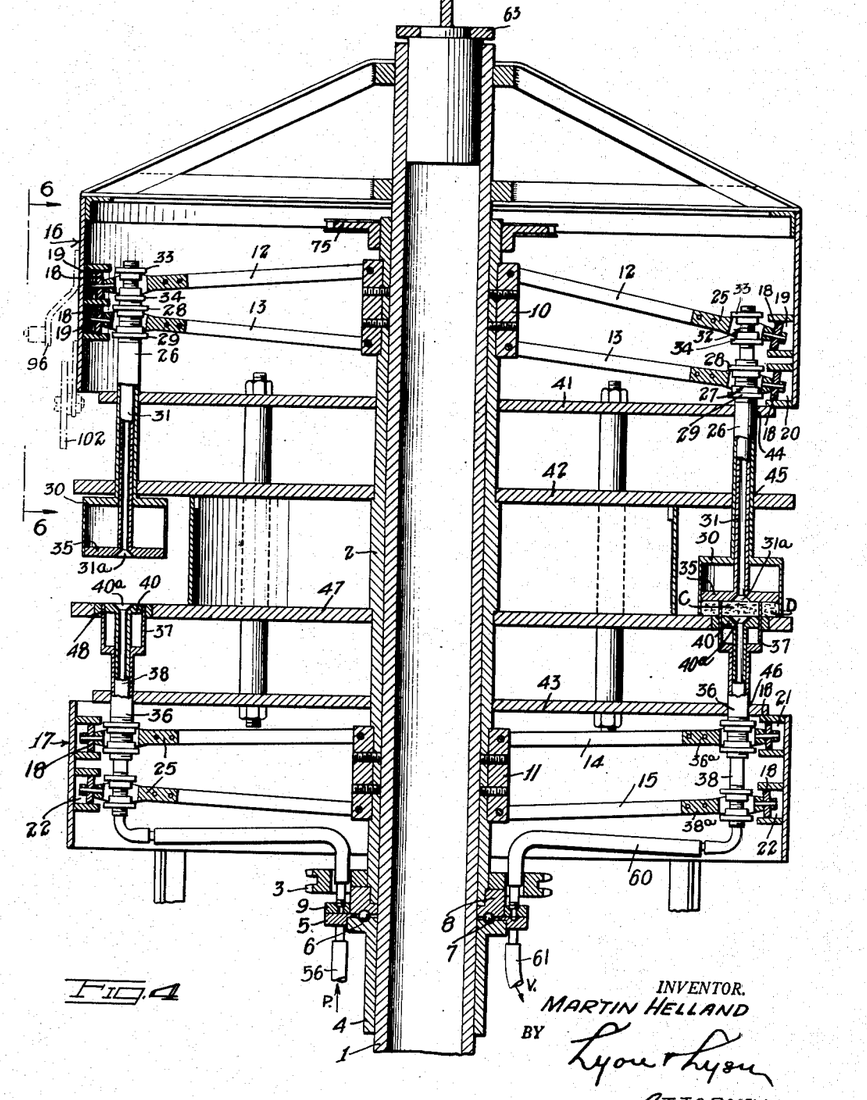
Figure 4 is a sectional view taken on the line 4—4 of Figure 3.
Figure 5:
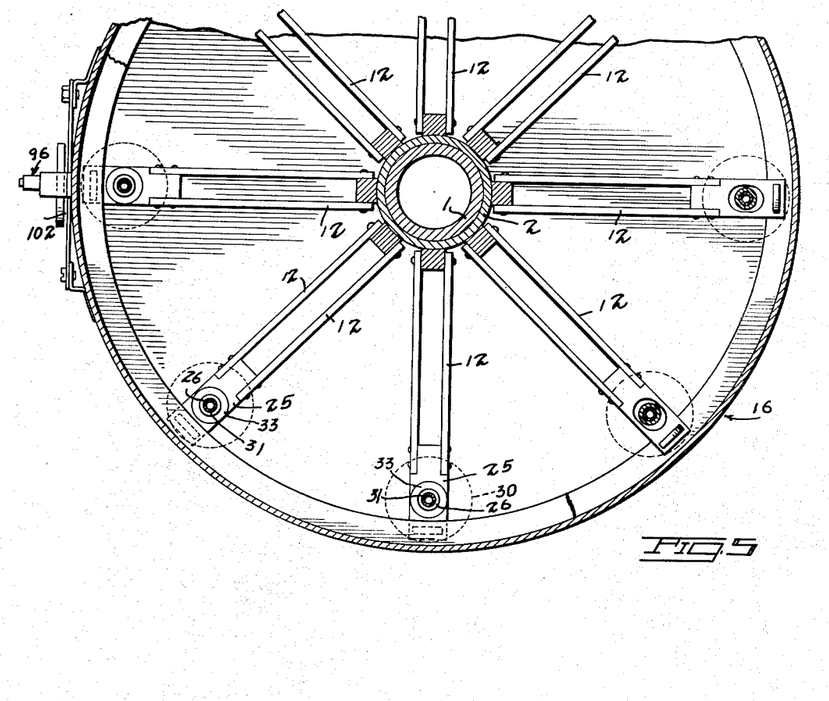
Figure 5 is a section taken on the line 5—5 of Figure 3.
Figure 6:
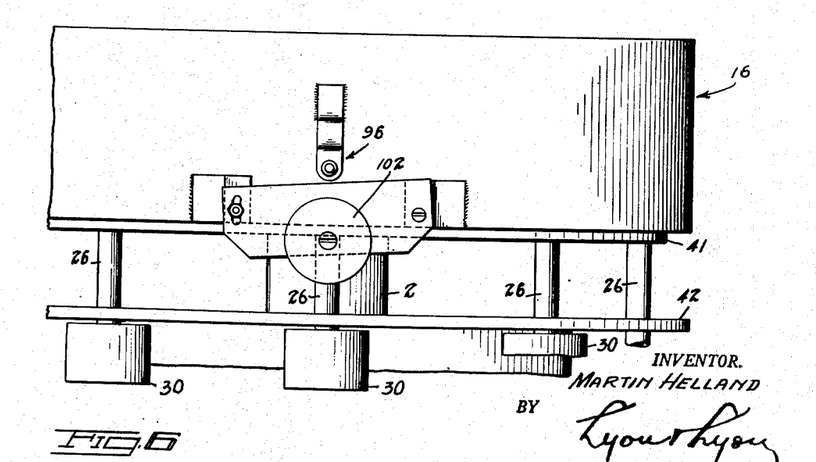
Figure 6 is an end elevation taken on the line 6—6 of Figure 4.
Figure 7:
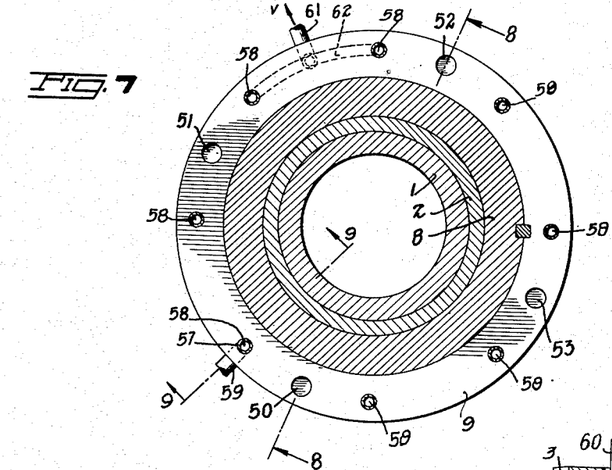
Figure 7 is a section taken on the line 7—7 of Figure 3.
Figure 8:
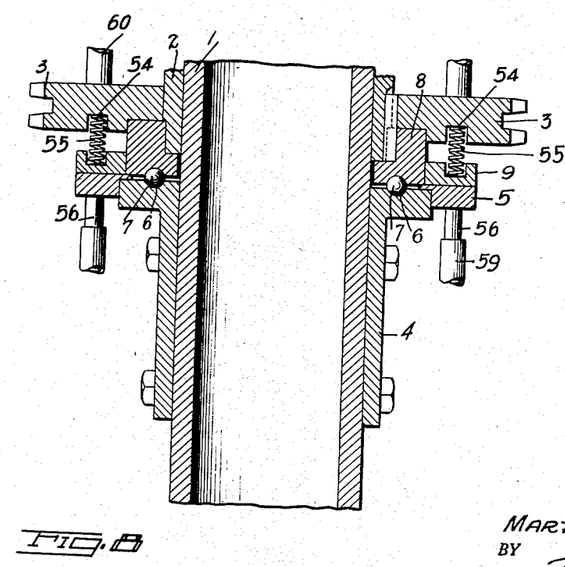
Figure 8 is a section taken on the line 8—8 of Figure 7.
Figure 9:
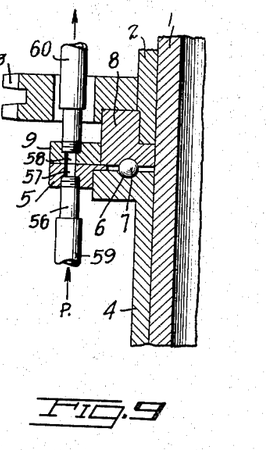
Figure 9 is a section taken on the line 9—9 of Figure 7.
Figures 10, 11, 12, 13:
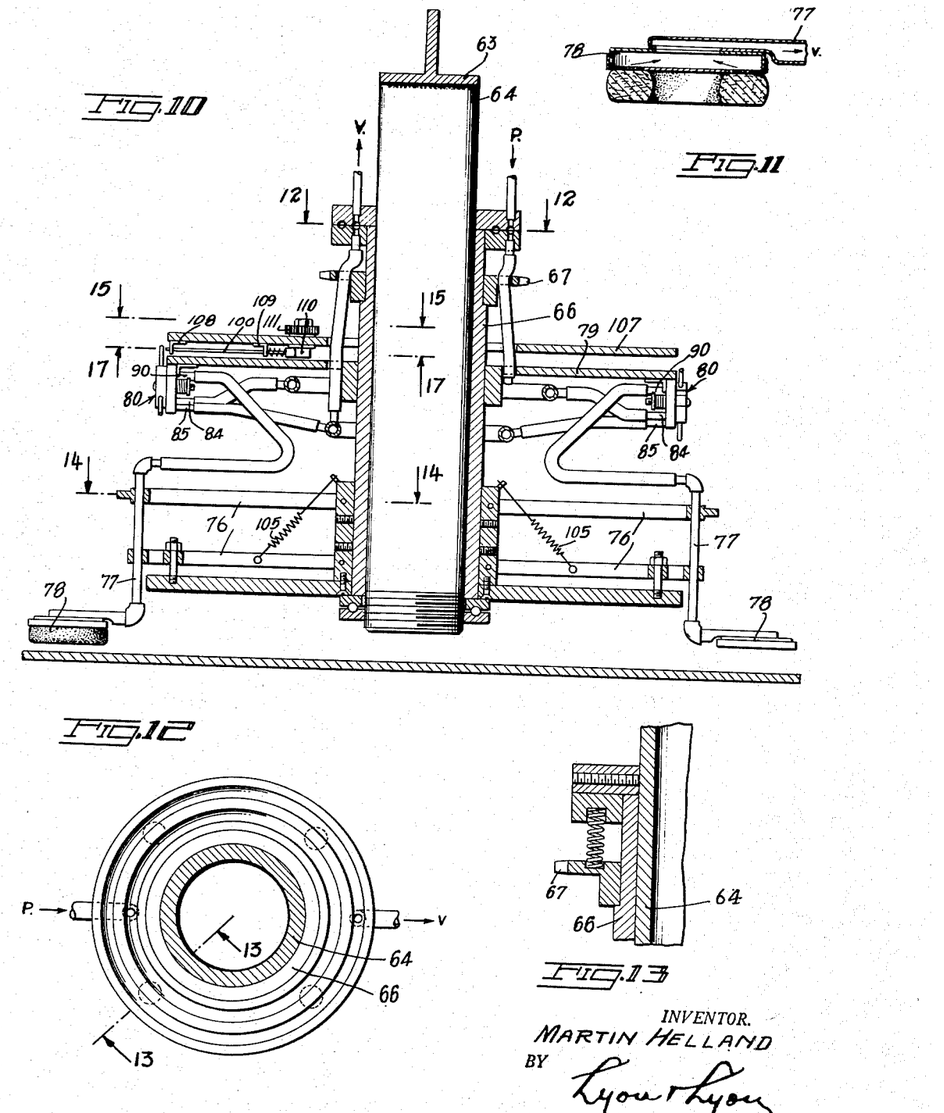
Figure 10 is a section taken on the line 10—10 of Figure 3.
Figure 11 is an enlarged section of a suction head with a doughnut in place.
Figure 12 is a section taken on the line 12—12 of Figure 10.
Figure 13 is a section taken on the line 13—13 of Figure 12.
Figure 14:
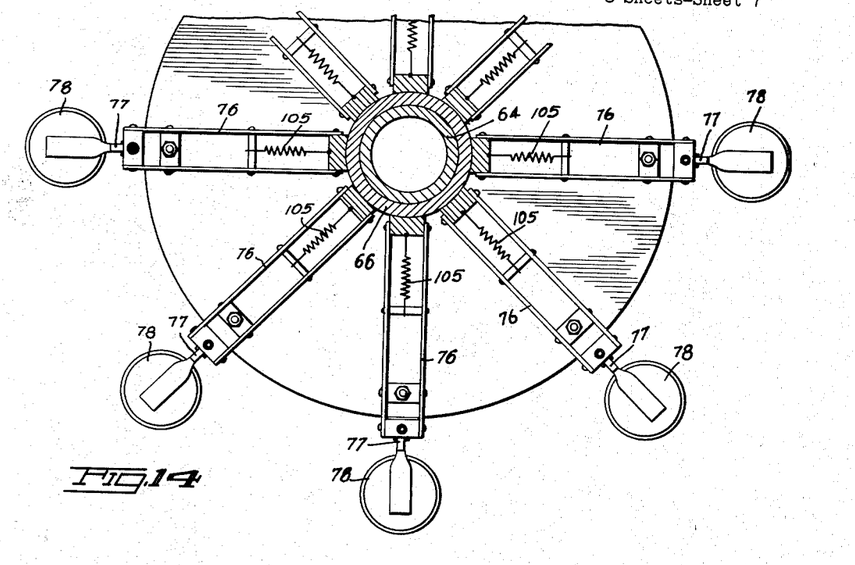
Figure 14 is a sectional view taken on the line 14—14 of Figure 10.
Figure 15:
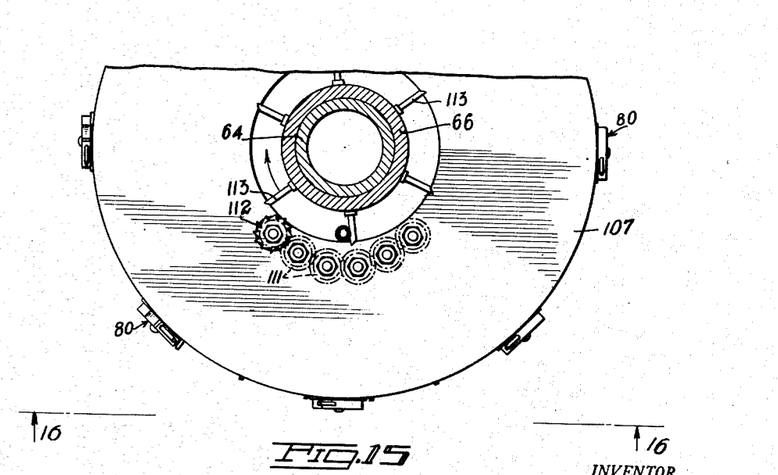
Figure 15 is a section taken on the line 15—15 of Figure 10.
Figure 16:
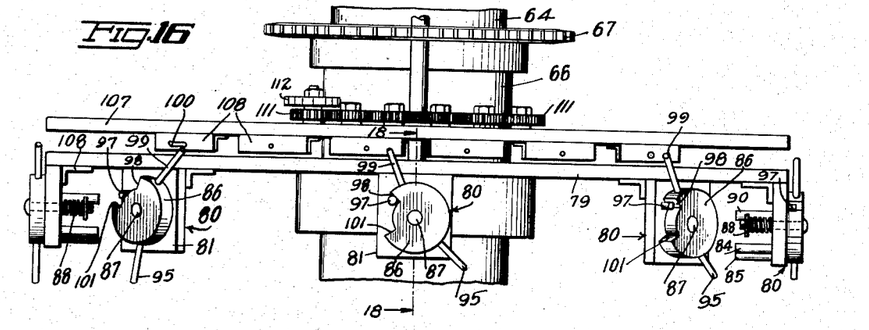
Figure 16 is an elevation taken along the line 16—16 of Figure 15.
Figure 17:
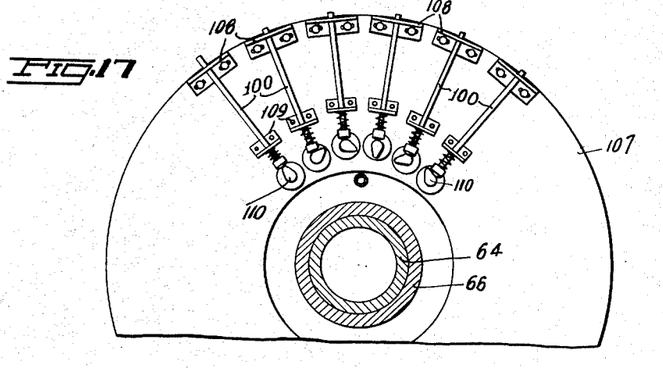
Figure 17 is a section taken on the line 17—17 of Figure 10.

As the sleeve 2 and bed plate 47 rotate from the 180° to the 225° position carrying the ball of dough D, the guide channel 20 descends and then the guide channel 19 descends, forcing down the arms 12, ring 30, arms 13 and pressure plate 35, respectively. The ring 30 confines the ball of dough to the desired maximum width and the pressure plate 35 flattens the dough, as shown in Figure 2. The other guide channels remain in their first described positions.

Between the 225° position and the 270° position the guide channel 21 causes the arms 14 to raise, carrying with it the cup 37 so that a central core C is punched out by the cup 37. As the bed plate 47 rotates to the 315° position the first edge of the slot 62 aligns itself with the port 58 connected with the particular tube 36 and ports a vacuum into the interior of the cup 37 and through the hollow push rod 38, and the port 40a so that the vacuum acts on the core C and holds it firmly on the ejector plate 40. At the same time the guide channels 19 and 20 raise the ring 30 and pressure plate 35 out of position.

The guide channel 22 is then postioned so that it forces the arms 15 downwardly pulling the ejector plate 40 with it and thus removing the core C from the doughnut D. Between the 315° position and the 360° position the guide channel 21 also lowers the arms 14 to remove the cup 37 from the doughnut D. At the 360° position the doughnut D is finished and is removed from the bed plate as hereinafter described.

Between the 0° position and the 45° position the guide channel 22 again raises the ejector plate 40 to its most upwardly extending position so that the core C is returned to the surface of the bed plate 47. At the same time the port 58 is no longer in alignment with the slot 62, thus releasing the core C from the ejector plate 40. At the 45° position the ports 57 align with the particular port 58 so as to port air under pressure to the particular pipe 59 to aid in expelling the core C from the ejector plate 40. Any kind of a gate will scrape the core C from the ejector plate back into the dough-mixing machine.

A bracket 63 is mounted upon the column 1 and carries thereon a shaft 64 threaded upon which is a collar 65 to maintain in rotatable position thereon a sleeve 66. The sleeve 66 carries thereon a gear 67 which meshes with a gear 68 carried on a rotatable sleeve 69 journaled on a shaft 69c. A gear 70 carried by the sleeve 69 meshes with the gear 71 on a rotatable sleeve journaled on a shaft 72a. A gear 73 carried upon the sleeve 72 is connected by a chain 74 to a gear 75 on the sleeve 2. By this connection of gears and chains it will be evident that when the sleeve 2 is rotated in one direction this train of gears and chains will cause the sleeve 66 to rotate in the oppposite direction.

Mounted upon the sleeve 66 are the eight arms 76 equally spaced around the sleeve 66. These arms carry at their ends a pipe 77 which supports the suction pads 78 and which port a decrease in pressure thereto from a suction source.

Mounted upon a bracket 79 on the sleeve 66 is a plurality of valve members 80, one directly above and corresponding in position to the position of the eight arms 76.

Figure 18:
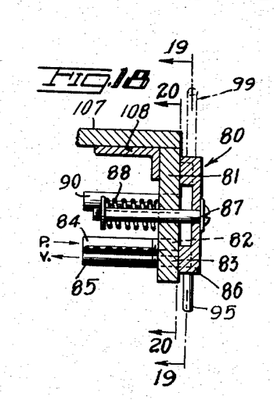
Figure 18 is a section taken on the line 18—18 of Figure 16.
Figure 19:
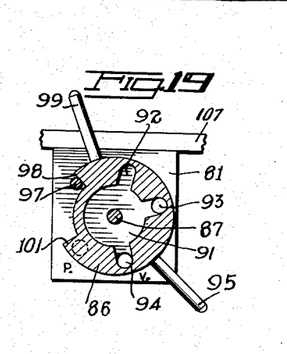
Figure 19 is a section taken on the line 19—19 of Figure 18.
Figure 20:
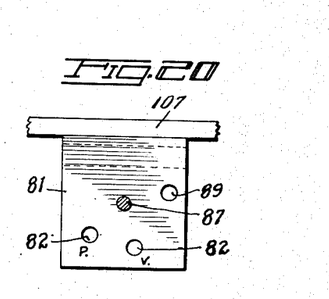

Referring specifically to Figures 18, 19 and 20, which are sectional views of the valve members 80, I provide a valve plate 81 having a pair of ports 82 and 83 connected to a source of air pressure 84 and of vacuum 85, respectively. A valve head 86 is rotatably held in position on the valve plate 81 by means of a bolt 87. A spring 88 is used to prevent leakage between the valve head 86 and valve plate 81. A port 89 is provided in the valve plate 81 and is connected to a pipe 90 to port air or vacuum to the pipe 77 and suction pads 78.

In the valve head 86 is a cavity 91 which has connecting ports 92, 93 and 94 therein adapted to register with the ports 82, 83 and 89. A pawl 95 fastened on the valve head 86 is adapted to engage a trip arm 96 carried by the housing 16 as the sleeve 66 is rotated, which causes the valve head 86 to rotate and align with the port 94 with the port 83 and the port 93 with the port 89, thus porting a vacuum to the suction pad 78. A pin 97 carried by the valve plate 81 is so positioned and acts as a stop for the shoulder 98 to prevent the pawl 95 from rotating the valve head 86 too far.

The pawl 99 is actuated by anyone of the pins 100 to rotate the valve head 86 in the opposite direction until the shoulder 101 strikes the pin 97, thus aligning the port 94 with the port 82 and the port 92 with the port 89, putting pressure into the pipes 90, 77 and suction pad 78.

As any one of the suction pads 78 passes over the zero degree (0°) point upon the bed plate 47 the arms 76 are depressed by a roller 102 engaging a pawl 103 carried by the arms 76 into contact with the preformed doughnut D on the bed plate 47. At this time the trip arm 96 actuates the valve member 80 to port a vacuum to the suction pad 78 so as to attach doughnut D to said suction pad 78.

After passing over the 0° point on the bed plate 47 the spring 105 raises the arms 76 and suction pads 78, lifting the doughnut D from the bed plate 47.

As the sleeve 66 rotates around it carries with it the arms 76 and suction pads 78 and when the pawl 99 contacts any one of the pins 100 the valve head 86 is rotated until air under pressure is ported into the suction pad, at which time the air exerts pressure to break the vacuum and the doughnut loose from the suction pad and deposit it upon the traveling bed 106.

I have provided six pins 100, all of them carried by a fixed plate 107 by means of the brackets 108 and 109. Adapted to engage the ends of the pins 100 are cams 110 which are rotated by the gears 111, which are rotatably carried by the fixed plate 107. On one of the gears 111 is a ratchet 112 which is engaged by the six pins 113 affixed to the sleeve 66. The cams 110 are positioned so that one of them contacts a different pin 100 each time a pin 113 rotates the ratchet 112 one-sixth of a rotation. This forces one pin 100 out for each one-sixth revolution of the sleeve 66. Thus the doughnuts lifted and carried by the arms 76 will be deposited in six rows upon the traveling belt 106 as the pins 100 reverse the valve mechanism 80 from vacuum to air pressure as the sleeve 66 rotates and passes the suction pads over the belt 106.

I claim:

1. A doughnut-making machine, comprising: a column, a driven rotary sleeve carried by said column, a bed plate carried by said sleeve having a plurality of holes therethrough upon which dough is fed, a plurality of arms pivotally supported upon said sleeve above said bed plate, shaping means carried by said arms, a plurality of arms pivotally supported upon said sleeve below said bed plate, means for cutting and removing the center of said dough carried by said second mentioned arms adapted to pass through the holes in said bed plate, guide means to cyclically actuate said arms to force said shaping means into contact with dough placed upon said bed plate and then to force said means for cutting and removing the center of said dough to act, and valve means actuated by said sleeve to port a vacuum to the interior of said means for cutting and removing the center of said dough and to hold said center while said means is removing said center.

2. A doughnut-making machine, comprising: a column, a driven rotary sleeve carried by said column, a bed plate carried by said sleeve having a plurality of holes therethrough upon which dough is fed, a plurality of arms pivotally supported upon said sleeve above said bed plate, shaping means carried by said arms, a plurality of arms pivotally supported upon said sleeve below said bed plate, means for cutting and removing the center of said dough carried by said second mentioned arms adapted to pass through the holes in said bed plate, guide means to cyclically actuate said arms to force said shaping means into contact with dough placed upon said bed plate and then to force said means for cutting and removing the center of said dough to act, valve means actuated by said sleeve to port a vacuum to the interior of said means for cutting and removing the center of said dough and to hold said center while said means is removing said center, and to admit air under pressure after said center has been removed to reject the center from said means for cutting and removing.

3. A doughnut-making machine, comprising: a column, a driven rotary sleeve carried by said column, a bed plate carried by said sleeve having a plurality of holes therethrough upon which dough is fed, a plurality of arms pivotally supported upon said sleeve above said bed plate, shaping means carried by said arms, a plurality of arms pivotally supported upon said sleeve below said bed plate, means for cutting and removing the center of said dough carried by said second mentioned arms adapted to pass through the holes in said bed plate, guide means to cyclically actuate said arms to force said shaping means into contact with dough placed upon said bed plate and then to force said means for cutting and removing the center of said dough to act, a second column, a rotary sleeve on said column driven by means from said first sleeve, arms pivotally carried by said last mentioned sleeve, suction pads carried by said arms in position to be depressed into contact with said shaped dough on said bed plate, means for depressing said suction pads into contact with said shaped dough after said shaping and means for cutting and removing the center have returned to rest after their cyclical actuation, and valve means actuated by the rotation of said second column to port a vacuum to said suction pads when said pads are in contact with said shaped dough to remove them from said bed plate and to port compressed air to said pads to remove said dough from said pads.

4. A doughnut-making machine, comprising: a column, a driven rotary sleeve carried by said column, a bed plate carried by said sleeve having a plurality of holes therethrough upon which dough is fed, a plurality of arms pivotally supported upon said sleeve above said bed plate, shaping means carried by said arms, a plurality of arms pivotally supported upon said sleeve below said bed plate, means for cutting and removing the center of said dough carried by said second mentioned arms adapted to pass through the holes in said bed plate, guide means to cyclically actuate said arms to force said shaping means into contact with dough placed upon said bed plate and then to force said means for cutting and removing the center of said dough to act, a second column, a rotary sleeve on said column driven by means from said first sleeve, arms pivotally carried by said last mentioned sleeve, suction pads carried by said arms in position to be depressed into contact with said shaped dough on said bed plate, means for depressing said suction pads into contact with said shaped dough after said shaping and means for cutting and removing the center have returned to rest after their cyclical actuation, valve means actuated by the rotation of said second column to port a vacuum to said suction pads when said pads are in contact with said shaped dough to remove them from said bed plate and to port compressed air to said pads to remove said dough from said pads, and a traveling belt positioned below said suction pads to receive said shaped dough from said pads.

5. A doughnut-making machine, comprising: a column, a driven rotary sleeve carried by said column, a bed plate carried by said sleeve having a plurality of holes therethrough upon which dough is fed, a plurality of arms pivotally supported upon said sleeve above said bed plate, shaping means carried by said arms, a plurality of arms pivotally supported upon said sleeve below said bed plate, means for cutting and removing the center of said dough carried by said second mentioned arms adapted to pass through the holes in said bed plate, guide means to cyclically actuate said arms to force said shaping means into contact with dough placed upon said bed plate and then to force said means for cutting and removing the center of said dough to act, a second column, a rotary sleeve on said column driven by means from said first sleeve, arms pivotally carried by said last mentioned sleeve, suction pads carried by said arms in position to be depressed into contact with said shaped dough on said bed plate, means for depressing said suction pads into contact with said shaped dough after said shaping and means for cutting and removing the center have returned to rest after their cyclical actuation, valve means actuated by the rotation of said second column to port a vacuum to said suction pads when said pads are in contact with said shaped dough to remove them from said bed plate and to port compressed air to said pads to remove said dough from said pads, a traveling belt positioned below said suction pads to receive said shaped dough from said pads, and a plurality of cams driven from said last mentioned sleeve, a plurality of pins actuated alternately by said cams, and means carried by said last mentioned valve means adapted to strike said actuated pins to shut off said vacuum and apply air pressure to said pads whereby said shaped dough is deposited in a plurality of rows on said traveling belt.

6. In a machine of the class described, paired arms pivotally supported by a column, a tube supported by one of said arms, a shaping ring carried by said tube, a push rod slidable in said tube supported by the other of said arms, a pressure plate carried by said push rod and positioned in said ring.

7. In a machine of the class described, paired arms pivotally supported by a column, a tube supported by one of said arms, a shaping ring carried by said tube, a push rod slidable in said tube supported by the other of said arms, a pressure plate carried by said push rod and positioned in said ring, and means for porting air to the outer surface of said pressure ring.

References Cited in the file of this patent

UNITED STATES PATENTS

| Number | Name | Date |
| --- | --- | --- |
| 181,862 | Mitchell | Sept. 5, 1876 |
| 757,488 | Nichols | Apr. 19, 1904 |
| 931,691 | Fendring | Aug. 17, 1909 |
| 1,150,655 | Bertram | Aug. 17, 1915 |
| 1,207,337 | Stokes | Dec. 5, 1916 |
| 2,068,619 | Bailey | Jan. 19, 1937 |
| 2,264,128 | Branch | Nov. 25, 1941 |
| 2,487,271 | Petri | Nov. 8, 1949 |